UNITED STATES PATENT OFFICE.

IGNAZ ROSENBERG AND FRIEDRICH KRECKE, OF BIEBRICH, GERMANY, ASSIGNORS TO KALLE & CO., OF SAME PLACE.

GREENISH-BLUE MIXED DISAZO DYE.

SPECIFICATION forming part of Letters Patent No. 613,641, dated November 1, 1898.

Application filed December 27, 1897. Serial No. 663,474. (Specimens.)

*To all whom it may concern:*

Be it known that we, IGNAZ ROSENBERG, a subject of the Emperor of Austria-Hungary, and FRIEDRICH KRECKE, a subject of the King of Prussia, German Emperor, doctors of philosophy, residing at Biebrich-on-the-Rhine, Germany, and assignors to KALLE & CO., of same place, have invented certain new and useful Improvements in the Manufacture of Greenish-Blue Mixed Disazo Dyestuffs, (for which we have obtained English Letters Patent No. 515 of January 9, 1894,) of which the following is a specification.

In the United States Patent No. 563,386 it is stated that the 1.8.4.6 amidonaphtholdisulfo-acid (K) is capable to combine with one molecular proportion of a diazotized paradiamin, forming an intermediate product which is still able to unite with another molecule of an amin or phenol, or of a sulfo or carbo acid of either of these, yielding mixed disazo coloring-matters. These coloring-matters possess the very valuable property of dyeing unmordanted cotton shades fast to washing from a bath prepared with alkali or salt. In following up this invention we have found that among the said coloring-matters there is especially one of high value—viz., that which is obtained by uniting the intermediate product from one molecule of tetrazo-diphenyl and one molecule of amidonaphtholdisulfo-acid (K) with one molecule of 2.8.6 amidonaphtholsulfo-acid, (G.) The combination of the tetrazo-diphenyl with the amidonaphtholdisulfo-acid, (K,) as well as with the amidonaphtholsulfo-acid, (G,) must be effected in alkaline solution.

In the following we describe the preparation of the said dyestuff:

Example: 36.8 kilos benzidin are dissolved in one thousand liters of water and one hundred and twenty kilos concentrated hydrochloric acid. After cooling with one thousand liters of ice-water the diazotation is effected by adding 27.6 kilos sodium nitrite in concentrated aqueous solution. The tetrazo-diphenyl solution is mixed with a solution of one hundred kilos calcined sodium carbonate in about one thousand liters of water, and then a solution of 68.2 kilos amidonaphtholdisulfo-acid (K) and twenty-four kilos caustic soda in one thousand liters of water is run into it. As soon as the intermediate product is completely formed a solution of fifty kilos 2.8.6 amidonaphtholsulfo-acid (G) and twenty-four kilos caustic soda in five hundred liters of water is added. After two to four hours' stirring the formation of the new dyestuff is completed. The mass is now heated and the dyestuff is precipitated by adding common salt. It is then filtered, pressed, and dried. This dyestuff is different from that obtained by combining the intermediate product from tetrazo-diphenyl and one molecular proportion of amidonaphtholsulfo-acid (G) with one molecular proportion of amidonaphtholdisulfo-acid, (K.)

The new dyestuff represents a bronze-colored powder easily soluble in cold water and only very difficultly soluble in hot alcohol. In concentrated sulfuric acid the dyestuff dissolves with a beautiful corn-flower color. From this solution the free acid of the coloring-matter separates on addition of water as a reddish-violet precipitate. By stannous chlorid and hydrochloric acid, as well as by zinc-dust and ammonia, the dyestuff is reduced, yielding in the former case a nearly colorless reaction liquid and in the latter case a dirty-green one. It dyes unmordanted cotton shades ranging from greenish blue to greenish black, according to the quantity of dyestuff used. It may be diazotized in substance as well as on the fiber, and especially in the latter case by combination with phenols or amins very fast and deep shades are obtainable.

What we claim is—

As a new article of manufacture the dyestuff obtained by combining the intermediate product from one molecule of tetrazo-diphenyl and one molecule of 1.8.4.6 amidonaphtholdisulfo-acid (K) with one molecule of 2.8.6 amidonaphtholsulfo-acid (G) in the manner hereinbefore described, which dyestuff exists as a bronze-colored powder easily soluble in cold water, very difficultly soluble in hot alcohol, and is characterized by giving with concentrated sulfuric acid a corn-flower-colored solution, from which solution the free acid of the coloring-matter is separated on addition of water as a reddish-violet precipitate, by being reduced with stannous chlorid and hydrochloric acid or with zinc-dust and ammonia, and finally by dyeing unmordanted cotton greenish-blue to greenish-black shades.

In testimony whereof we have signed our names to this specification in the presence of two subscribing witnesses.

IGNAZ ROSENBERG.
    FRIEDRICH KRECKE.

Witnesses:
 C. REINHARD,
 JACOB ADRIAN.